March 17, 1964 L. E. FISHER 3,125,628
VENTILATED BUSWAY AND HOUSING ARRANGEMENT
Filed March 30, 1962 2 Sheets-Sheet 1
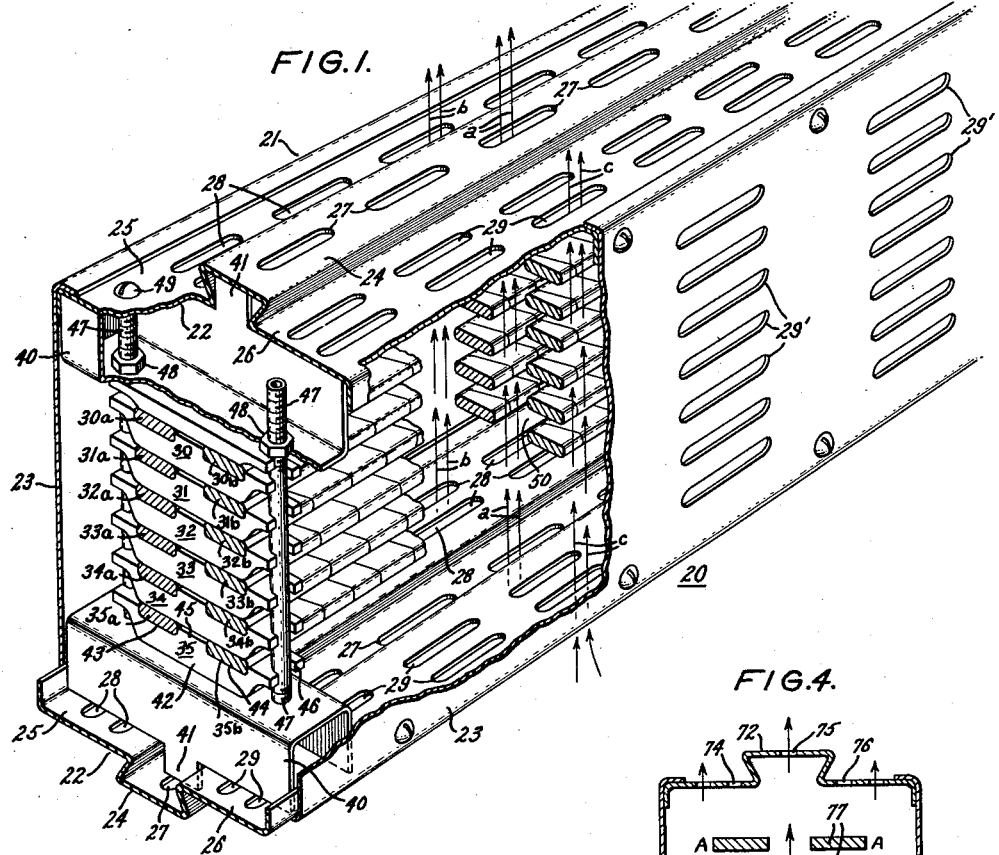
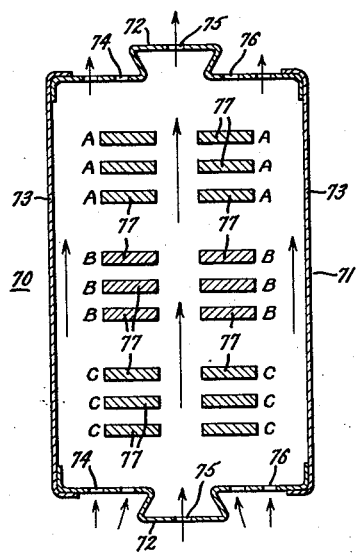
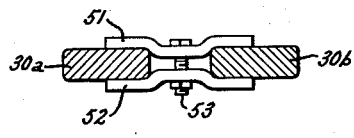
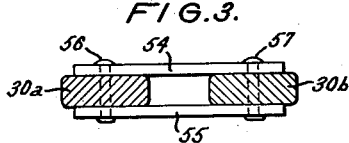
INVENTOR:
LAWRENCE E. FISHER,
BY *David M. Schiller*
ATTORNEY.

March 17, 1964     L. E. FISHER     3,125,628
VENTILATED BUSWAY AND HOUSING ARRANGEMENT
Filed March 30, 1962     2 Sheets-Sheet 2

INVENTOR:
LAWRENCE E. FISHER,
BY David M. Schiller
ATTORNEY.

United States Patent Office 3,125,628
Patented Mar. 17, 1964

3,125,628
VENTILATED BUSWAY AND HOUSING ARRANGEMENT
Lawrence E. Fisher, Southington, Conn., assignor to General Electric Company, a corporation of New York
Filed Mar. 30, 1962, Ser. No. 183,823
11 Claims. (Cl. 174—16)

This invention relates to busways and has particular relation to the ventilation of busways to dissipate heat generated therein.

In busway installations, problems arise as to the effective dissipation of heat generated by currents traversing the bus bars and such problems are particularly troublesome in busways adapted to carry high currents, such as currents of the order of a thousand amperes and more. The problems of heat dissipation are particularly acute in so called edgewise mounted installations wherein the busway is mounted so that the bus bars are in vertically spaced horizontally extending planes. Such orientation of the bus bars impedes the upward flow of air through the busway so as to prevent the effective dissipation of heat from the bus bars in the busway. The problem of heat dissipation is also present in so called flat mounted installations wherein the bus bars lie in horizontally spaced, vertically extending planes.

It is accordingly a primary object of the present invention to provide a novel and improved busway of lightweight and inexpensive construction with provision for the effective dissipation of heat generated by current flowing through the bus bars.

It is another object of the invention to provide a busway of lightweight and inexpensive construction designed to assure the effective dissipation of heat therefrom regardless of the particular orientation of the busway when installed.

It is still another object of the invention to provide a busway having bus bars arranged in a novel and improved manner so as to greatly increase current density values of the bus bars at a given permissable temperature rise and so as to provide a low voltage drop system.

It is a further object of the invention to provide a busway including a housing with opposed walls having ventilating slots and bus bars arranged in a novel manner to provide a continuous air passage interconnecting the ventilating slots to permit the effective dissipation of heat from the busway.

In carrying out the invention in one preferred form, a busway is provided including a housing with two pairs of opposed walls, the walls of at least one pair having ventilating slots formed therein. A plurality of electrically interconnected bus bar assemblies are mounted in the housing in spaced relation with flat lengths thereof in face-to-face relation defining planes spaced in the direction of spacing of the opposed ventilated walls. Each bus bar assembly has material removed therefrom to define an elongated passage therethrough and to this end is preferably comprised of a pair of individual bars spaced transversely of the direction of spacing of the ventilated walls. The spaces between the individual bars of each bus bar assembly are substantially aligned and provide a continuous air passage extending between the ventilated walls to interconnect the ventilating slots therein. Each of the bus bar assemblies is spaced from the other pair of walls, which also may have ventilating slots, and these spaces also form a pair of substantially continuous air passages interconnecting the ventilating slots of the first-named ventilated walls. The continuous air passages permit the free flow of air through the busway to assure the effective dissipation of heat generated therein. The invention is applicable to busways including bus bar assemblies arranged in various configurations such as interlaced, paired phase, split phase, and current limiting.

Other objects and advantages of the invention will become apparent from the following description taken in conjunction with the accompanying drawings in which:

FIG. 1 is a view in perspective with parts broken away and with parts in section showing a busway constructed in accordance with the teachings of the invention with bus bar assemblies arranged in interlaced relation;

FIG. 2 is a view in elevation with parts in section showing a connector associated with two individual bars of one bus bar assembly and adjacent a plug-in area;

FIG. 3 is a view similar to FIG. 2 showing a different connector arrangement;

FIG. 4 is a view in section of a busway differing from the busway of FIG. 1 in that the bus bar assemblies are arranged in current limiting relation;

Figure 5:
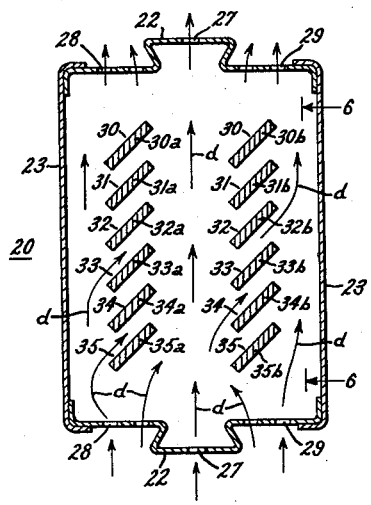
FIG. 5 is a view in section of a busway similar to the busway of FIG. 1 but with the bus bar assemblies having twisted portions intermediate their ends.

Referring now to the drawings there is illustrated in FIG. 1 a busway 20 in edgewise position including a housing 21 formed of a pair of horizontally extending vertically spaced top and bottom walls 22 which are connected to a pair of horizontally spaced vertically extending side walls 23. Each of the walls 22 includes a centrally located longitudinally extending channel 24 having a pair of outwardly extending parallel flanges 25 and 26. To assist in dissipation of heat generated within the housing a plurality of ventilating slots are provided in each of the walls 22 and 23, and in the illustrated embodiment the slots in each wall 22 are arranged in longitudinally extending rows with a central row consisting of slots 27 elongated in the direction of extension of the busway and in the channel 24, two outer rows consisting of slots 28 elongated in the manner of the slots 27 and in the flange 25, and two additional outer rows consisting of elongated slots 29 in the flanges 26. The slots 27, 28 and 29 are spaced longitudinally of the housing and each is elongated in a direction generally parallel to the longitudinal extent of the housing. Slots 29' are preferably formed in each of the side walls 23 and are elongated in the direction of elongation of the slots 27, 28 and 29.

Mounted within the housing 20 are a plurality of spaced bus bar assemblies 30–35 constructed of electroconductive material such as copper or aluminum and adapted for energization from one or more multiphase voltage sources (not shown) to carry multiphase electric currents. The busway assemblies 30–35 are supported within the housing in edgewise relation to the side walls 23 and are spaced in the direction of spacing of the walls 22 so that the assemblies define a plurality of vertically-spaced horizontally-extending planes as viewed in FIG. 1.

In accord with the present invention each of the bus bar assemblies has material removed therefrom to provide one or more ventilating passages in the bus bar assembly with the passages so formed in the several assemblies being aligned in the vertical direction to provide a continuous air passage extending between the walls 22 to interconnect the ventilating slots 27, 28, and 29 of the walls 22. The material may be removed by punching, drilling, etc., and is preferably removed from the center of the bus bar assembly for the reason that in actual practice the material adjacent the center of a bus bar assembly does not carry much current due to skin or edge effects which causes most of the current to traverse the material adjacent the outer edges of the bus bar assembly.

In the preferred embodiment, each bus bar assembly is comprised of two individual bus bars each of reduced width mounted in edge-to-edge relation and spaced from each other in the direction of spacing of the side walls 23. In effect, material is removed from the central area of a bus bar of conventional width throughout its length to provide a ventilating passage therethrough which greatly increases the amount of heat dissipated therefrom. The two individual bars therefore can carry the same total current as the conventional bar for substantially the same temperature rise so that the obtainable current density is increased considerably in the two bars. Also, the material removed from each conventional bus bar contributes to a considerable saving of conductor material and to a lessening in the overall weight of the busway. By way of example, the two individual bars of each bus bar assembly replace the standard two inch wide bus bar previously used with each of the individual bars having a width of three-quarter inch, leaving a space between the individual bars of one-half inch. A current density of the order of 1700 amperes per square inch of copper for a bus bar assembly is obtainable in the previous example. In FIG. 1 the two individual bars forming a single bus bar assembly are represented by the same reference numeral as the bus bar assembly generally, but with the suffixes a and b added. While the overall proportions of the assembly consisting of two individual bars are shown as being essentially the same as the proportions of a single standard bar heretofore utilized, it is understood that dimensions of the two individual bars can be varied if desired.

In order to secure the bus bars together in operative position a plurality of securing and clamping means is provided only one of which is shown in FIG. 1. Such means includes a pair of channel-shaped members 40 positioned with the edges of the flanges of members 40 abutting the flanges 25 and 26 of the walls 22 and with extensions 41 of the flanges of members 40 entering into the channels 24. For the purpose of properly spacing the assemblies 30-35 and the bus bars of each assembly a plurality of insulating spacers 42 are positioned between the channel-shaped members 40 in alternation with the assemblies 30-35. Each of the spacers 42 includes a pair of recesses 43 and 44 in which the associated bus bars of each assembly are positioned, and a central projection 45 extends from each spacer between the supported bus bars to properly space said bus bars from each other. The ends of each spacer 42 include slots 46 through which extend a pair of threaded tie bolts 47 which also extend through openings in the bases of the members 40 so that the threaded ends of the bolts abut the inner surfaces of the housing walls 22. Threaded nuts 48 on the tie bolts engage the bases of the members 40 and screws 49 extend through openings in the walls 22 into threaded engagement with internal openings formed in the threaded ends of the tie bolts 47. A number of securing and spacing means just described may be spaced along the length of the busway as desired.

As shown in FIG. 1, the spaces between the pairs of bus bars forming the bus bar assemblies are aligned with one another to provide a vertically extending continuous air passage 50 between the walls 22 which interconnect the ventilating slots 27, 28 and 29 in such walls. Thus, free flow of air is permitted vertically through the busway as indicated by the arrows a to provide effective dissipation of heat generated within the busway by current traversing the bus bars. This arrangement provides a very effective heat dissipation when the busway 20 is edgewise mounted as shown in FIG. 1 with the bus bar assemblies lying in planes extending horizontally and spaced vertically. It is noted also that the bus bar assemblies are spaced from the sidewalls 23 so as to form a pair of additional air passages extending between the walls 22 substantially continuously to permit the flow of air as indicated by arrows b and c and further assist in dissipation of heat generated in the busway. Improvement in performance by means of the invention also results for flatwise mounting of the busway. A standard busway with six bars each ¼" by 2" and interlaced in recurring phase sequence carries approximately twenty-three percent less current when edgewise than when flatwise whereas with the present invention the differential is reduced to about thirteen percent.

At spaced intervals longitudinally of the busway intermediate the securing and spacing means previously described, means are preferably provided to electrically connect the individual bars of certain ones of the bus bar assemblies adjacent plug-in areas. Such a connecting means is shown in FIG. 2 as including a pair of electroconductive brackets 51 and 52 which have terminal portions overlapping and engaging opposite surfaces of the two bars, shown as the bars 30a and 30b, so as to form pockets containing portions of the two bars. The members 51 and 52 include central depressed portions between the bars and having openings to receive fastening means in the form of a screw and nut assembly 53. A different connecting arrangement is shown in FIG. 3 including a pair of flat electroconductive plates 54 and 55 having terminals which overlap and engage opposite surfaces of the bus bars and having openings in such terminals through which extend suitable fastening means such as rivets 56 and 57. The connectors just described are utilized when the busway is designed to receive plug-in devices so that current is drawn by such devices equally from the two individual bars of the assemblies from which current is to be drawn by the plug-in devices.

Figure 6:
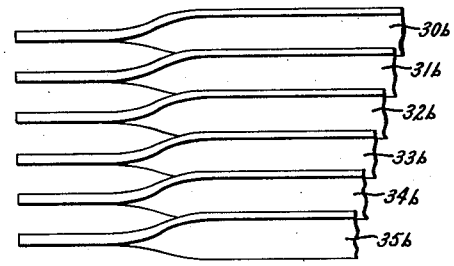
FIG. 6 is a view taken along the line 6—6 of FIG. 5.

To further assist in dissipating heat generated within the busway, some or all of the bus bars may be positioned so as to form acute angles with a plane parallel to the walls 22. One such arrangement is shown in FIGS. 5 and 6 wherein all of the bus bars of the assemblies 30-35 include selected lengths intermediate their ends twisted out of the planes of the ends of the bus bars at angles of the order of 45° with respect to such planes. If desired, the bus bars may be so twisted substantially throughout their entire length except at plug-in areas, except at the ends of the bars where joints are to be made, and except at areas wherein the bus bar securing means are located. With such arrangement air entering the ventilating slots 27, 28 and 29 in the lower one of the walls 22 for an edgewise mounted busway as shown takes a number of paths in order to exit through the ventilating slots 27, 28 and 29 formed in the upper one of the walls 22. These paths include not only the air passages formed between the bus bars of each assembly and formed at the sides thereof, but also the passages between the bus bars in each vertical column as viewed in FIG. 5 so as to more effectively remove heat from the bus bars. Air flow through the latter passages is indicated by the arrows d.

The invention may be applied in connection with busways having bus bar assemblies arranged in various electrically interconnected configurations. For example, in FIG. 1 the bus bar assemblies 30-35 are arranged in interlaced relation in recurring phase sequence with no two adjacent assemblies having the same polarity. Thus, the assemblies 30-35 in FIG. 1 are arranged respectively in phase sequence ABCABC with two assemblies for each electrical phase. Also, the bars of each assembly have the same phase. Accordingly, the four bars of assemblies 30 and 33 are connected to phase A, the four bars of assemblies 31 and 34 are connected to phase B, and the four bars of assemblies 32 and 35 are connected to phase C.

In FIG. 4 there is shown a busway 70 including a housing 71 similar to the housing 21 of FIG. 1, and including upper and lower walls 72 and side walls 73 with ventilating slots 74, 75 and 76 in the walls 72 and ventilating slots (not shown) in the walls 73. Mounted within the housing 71 are a plurality of vertically spaced bus bar assemblies 77 arranged in a configuration providing a high reactance current limiting busway the theory of which is set forth in Patent No. 2,786,151. The bus bar assemblies 77 are arranged in three groups each adapted for connection to a separate phase of a three phase source of voltage (not shown). As shown in FIG. 4, the upper group of three bus bar assemblies is adapted for connection to phase A, the assemblies of the middle group to phase B, and the assemblies of the lower group to phase C. In the embodiment of FIG. 4, three bus bar assemblies are provided for each electrical phase making a total of nine assemblies, but it is to be understood that any desired number of bus bar assemblies per phase may be provided. As described in the aforementioned Patent 2,786,151 the bus bar assemblies 77 are arranged to limit the short circuit current to an acceptable level, and for this purpose, the groups of assemblies 77 are spaced by relatively large distances so as to provide a large interphase spacing, and the assemblies 77 within each group are spaced by distances smaller (less than one half) than the distances by which the groups are spaced to provide a relatively small intraphase spacing.

As in FIG. 1, each bus bar assembly 77 in the busway of FIG. 4 is composed of a pair of individual bars mounted in spaced edge-to-edge relation so that an air passage is formed between the individual bars of the assemblies to provide a chimney effect for air entering through the ventilating slots in the lower wall 72 and exiting through the ventilating slots in the upper wall 72. However, each assembly may have material removed therefrom by punching, etc., so that each assembly comprises a single bar rather than two spaced bars as shown. The bus bar assemblies 77 also are spaced from the side walls 73 to provide additional air passages. If desired, the individual bars may be twisted along selected lengths thereof in the manner shown in FIGS. 5 and 6. It is noted that the individual bars of each of the assemblies 77 have the same polarity, so that in effect the individual bars take the place of a single bar of conventional width with conducting material removed therefrom as described in connection with FIG. 1. The busway 70 of FIG. 4 may of course be mounted either edgewise or flatwise as desired. The arrows shown in FIG. 4 depict the direction of air flow through the busway.

The invention is equally applicable to busways of the high reactance current limiting type above described and to busways of the feeder type wherein the bus bar assemblies are arranged to provide a low reactance resulting in low voltage drop. Such known bus bar arrangements as interlaced, paired phase, and split phase each provides a satisfactory low reactance, low voltage drop system. As previously described, the bus bar assemblies 30–35 of the busway of FIG. 1 are interlaced in recurring phase sequence so that no two adjacent assemblies have the same polarity. Thus, reading from top to bottom in FIG. 1, the assemblies 30–35 are arranged in the phase relation ABCABC with two bars being connected to each electrical phase of a multi-phase source. In the interlaced arrangement of FIG. 1 the individual bars of each bus bar assembly may have the same polarity as described or may have different polarities as will appear hereinafter.

Figure 7:
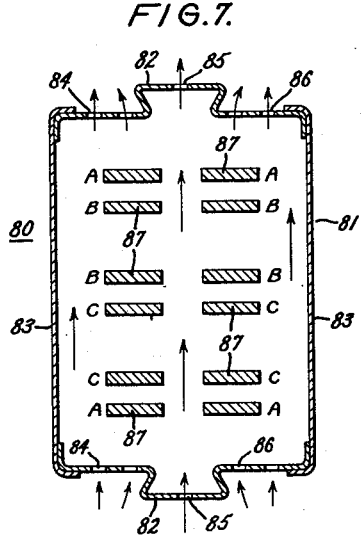
FIG. 7 is a view in section of a busway differing from the busways of FIGS. 1 and 4 in that the bus bar assemblies are arranged in paired phase relation.

In FIG. 7 a low impedance feeder busway 80 is illustrated having bus bar assemblies arranged in paired phase relation. The busway 80 includes the housing 81 identical in all respects to the housing 21 of FIG. 1 and including upper and lower walls 82 and side walls 83 with ventilating slots 84, 85 and 86 in the walls 82 and with ventilating slots (not shown) in the walls 83. Within the housing 81 are mounted a plurality of bus bar assemblies 87 spaced from the side walls 83 to provide air passages and arranged in a number of groups, three such groups being illustrated, with each group containing a pair of bus bar assemblies of different phase and with the two assemblies in each group being spaced vertically by a distance which is considerably less than the vertical distance by which the groups are spaced. In FIG. 7, the bus bar assemblies are arranged in the phase relation AB—BC—CA and as in FIG. 1, each of the assemblies 87 consists of two individual bus bars mounted in edge-to-edge relation and spaced in the direction of spacing of the side walls 83 so as to provide a passage therebetween forming a composite air passage uninterrupted between the walls 82 to interconnect the ventilating slots in the walls 82. Again, each assembly may comprise a single bar having centrally located holes formed by punching, etc. rather than two individual bars. It is noted in FIG. 7 that the two bars of each assembly 87 are of the same phase. The arrows shown in FIG. 7 depict the direction of air flow through the busway 80. The bars of the assemblies 87 may be twisted as described in connection with the busway of FIG. 1, and the busway 80 may be mounted either edgewise or flatwise.

Figure 8:
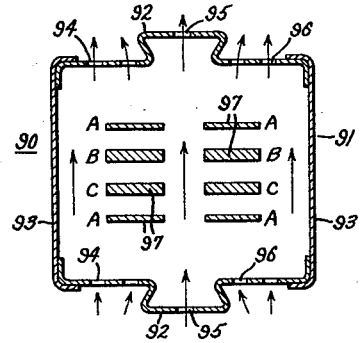
FIG. 8 is a view in section of a busway differing from the busways of FIGS. 1, 4 and 7 in that the bus bar assemblies are arranged in split phase relation.

Referring now to FIG. 8, there is shown a busway 90, including bus bar assemblies arranged in split phase relation to provide a low reactance system. The busway 90 includes a housing 91 with opposed top and bottom walls 92 and opposed side walls 93 with the walls 92 having ventilating slots 94, 95 and 96. The bus bar assemblies 97 within the housing 91 are substantially equally spaced vertically and are mounted edgewise of the walls 93 to have the phase relation ABCA. Each assembly 97 is shown as comprised of two individual bars spaced in the direction of spacing of the side walls 93 and mounted in edge-to-edge relation but each assembly may instead be comprised of a single bar having centrally located holes or passages formed by drilling, etc. The spaces between the two bars of each assembly and between the edges of the assemblies and the side walls 93 form air passages extending between the walls 92 to interconnect the ventilating slots in such walls. The two bars of each assembly have the same polarity as indicated in FIG. 8, and the bars having the A phase preferably have a thickness which is about one-half that of the other bars. The arrows in FIG. 8 depict the direction of air flow and some or all of the bars may be twisted in the manner shown in FIGS. 5 and 6. Also, the busway 90 may be mounted edgewise as shown or flatwise as desired.

Figure 9:
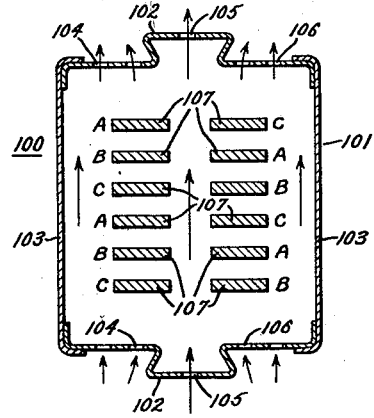
FIG. 9 is a view in section of a busway similar to the busway of FIG. 1 with bus bar assemblies arranged in modified interlaced relation.

Referring now to FIG. 9 there is illustrated a busway 100 including a housing 101 similar to the housing 21 of the busway 20 in FIG. 1 and consisting of top and bottom walls 102 and side walls 103 with ventilating slots 104, 105 and 106 in the walls 103. Vertically spaced bus bars assemblies 107 are provided in the housing spaced from the side walls 103 and each of the bus bar assemblies 107 includes a pair of edge-to-edge spaced individual bus bars arranged as in the busway of FIG. 1. However, the individual bars in the left hand vertical column as viewed in FIG. 9 are interlaced in recurring phase sequence with phase relation ABCABC whereas the individual bars in the right hand column as viewed in FIG. 9 are interlaced in recurring phase sequence with phase relation CABCAB. It is noted that in the arrangement of FIG. 9 no two adjacent bars in each column have the same phase and also no two horizontally spaced bars have the same phase. It is found with the arrangement of FIG. 9 that a very low voltage drop feeder busway is provided especially if the horizontal dimension of the passage between the individual bars as viewed in FIG. 9 is made relatively small compared to the corresponding dimension thereof in the previous examples of FIGS. 1, 4, 7 and 8. In the busway 100 of FIG. 9 the two phase A bars would be connected to phase A of a multiphase source (not shown) the two phase B bars connected to phase B of the source, and the two phase C bars connected to phase C of the source. The arrows in FIG. 9 depict the direction of air flow and some or all of the bars of the assemblies 107 may be twisted in the manner shown in FIGS. 5 and 6. Also, the busway 100 may be mounted edgewise as shown or flatwise.

In its broad aspects the invention involves the removal of material from a bus bar to provide one or more vents or passages through the bus bar. The material is preferably removed near the centerline of the bar where the conductor material carries very little current due to skin or edge effects. In the embodiments illustrated such removal of material is accomplished by providing a plurality of individual bars in spaced edge-to-edge relation to take the place of the standard width bar, the overall width of the assembly comprising the individual bars preferably being essentially the same as the width of the standard bar. It is appreciated that the vents or passages can be provided in other ways such, for example, as splitting a standard bar along a length thereof intermediate its ends and removing material from the split. Such arrangement retains the single bar configuration. The invention is applicable to busways of the high reactance current limiting type and to low reactance feeder types such as interlaced, paired phase and split phase, and results in a saving of conductor material which contributes to a light weight and inexpensive busway. Further, the ventilation and therefore the dissipation of heat is greatly improved which permits very high current densities of the bus bars regardless of the mounting of the busway whether edgewise or flatwise.

While I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. A busway comprising a housing having two pairs of opposed walls, each wall of at least one pair having ventilating slots arranged in a plurality of rows extending longitudinally of the housing, and a plurality of elongated bus bar assemblies electrically interconnected in polyphase relationship in the housing, said bus bar assemblies having flat lengths in face-to-face relation defining planes spaced in the direction of spacing of the walls of said one pair, each bus bar assembly having a central passage therethrough extending along a certain length thereof, said passages being substantially aligned to form a continuous air passage extending between the walls of said one pair to interconnect the ventilating slots in the walls of said one pair, said bus bar assemblies being spaced from the walls of the other pair to provide a pair of additional air passages interconnecting the ventilating slots in the walls of said one pair.

2. A busway as defined in claim 1 wherein said bus bar assemblies are interlaced in recurring phase sequence with adjacent assemblies having different polarities to provide a low reactance system.

3. A busway as defined in claim 1 wherein said bus bar assemblies are arranged in paired phase relation including a plurality of spaced pairs of assemblies with the assemblies of each pair having different polarities and being spaced by a distance less than the distances by which the pairs are spaced to provide a low reactance system.

4. A busway as defined in claim 1 wherein said bus bar bar assemblies are arranged in split phase relation with phase sequence ABCA to provide a low reactance system.

5. A busway as defined in claim 1 wherein the bus bar assemblies are arranged in different phase groups with the interphase spacing between groups being greater than the intraphase spacing of assemblies in each group to provide a high reactance current limiting system.

6. A busway comprising a housing having two pairs of opposed walls, each wall of at least one pair having a plurality of ventilating slots, and a plurality of elongated bus bar assemblies electrically interconnected in polyphase relationship in the housing, said bus bar assemblies having flat lengths in face-to-face relation defining planes spaced in the direction of spacing of the walls of said one pair, each bus bar assembly comprising a pair of individual bars spaced transversely of the direction of spacing of the walls of said one pair, the spaces between the individual bars of each assembly providing a substantially continuous air passage extending between the walls of said one pair to interconnect the ventilating slots in the walls of said one pair.

7. A busway as defined in claim 6 wherein said bus bar assemblies are interlaced in recurring phase sequence with adjacent assemblies having different polarities, the bars of each assembly having the same polarity to provide a low reactance system.

8. A busway as defined in claim 6 wherein the sets of individual bars on each side of said air passage are interlaced in recurring phase sequence with adjacent bars in each set having different polarities, the bars of each bus bar assembly also having different polarities to provide a low reactance system.

9. A busway as defined in claim 6 wherein said bus bar assemblies are arranged in paired phase relation including a plurality of spaced pairs of assemblies with the assemblies of each pair having different polarities and being spaced by a distance less than the distances by which the pairs are spaced, the bars of each assembly having the same polarity to provide a low reactance system.

10. A busway as defined in claim 6 wherein said bus bar assemblies are arranged in split phase relation with phase sequence ABCA, the bars of each assembly having the same polarity to provide a low reactance system.

11. A busway as defined in claim 6 wherein said bus bar assemblies are arranged in different phase groups with the interphase spacing between groups being greater than the intraphase spacing of assemblies in each group, the bars of each assembly having the same polarity to provide a high reactance current limiting system.

References Cited in the file of this patent

UNITED STATES PATENTS

| | | |
|---|---|---|
| 2,287,502 | Togesen et al. | June 23, 1942 |
| 2,477,523 | Myers | July 26, 1949 |
| 2,786,151 | Fisher | Mar. 19, 1957 |
| 2,960,674 | Harton | Nov. 15, 1960 |
| 3,044,036 | Herrmann | July 10, 1962 |

FOREIGN PATENTS

| | | |
|---|---|---|
| 833,041 | Great Britain | Apr. 21, 1960 |

OTHER REFERENCES

Federal Pacific Catalog No. 3–105, p. 53, August 1955.
Federal Pacific Bulletin 3–115, p. 14, July 1957.